United States Patent [19]

Murphy

[11] 4,355,497
[45] Oct. 26, 1982

[54] APPARATUS FOR TRIMMING TREES
[76] Inventor: Bruce Murphy, Rte. 2, Coolidge, Ga. 31738
[21] Appl. No.: 222,656
[22] Filed: Jan. 5, 1981
[51] Int. Cl.³ .......................................... A01D 55/18
[52] U.S. Cl. ...................................... 56/235; 56/10.2; 56/DIG. 15
[58] Field of Search ............................. 56/233–238, 56/DIG. 15, 10.2; 144/22, 3 D, 236, 237

[56] References Cited
U.S. PATENT DOCUMENTS

| | | | |
|---|---|---|---|
| 3,496,709 | 2/1970 | Egbert et al. | 56/237 |
| 3,605,392 | 9/1971 | Fossum | 56/237 |
| 3,913,304 | 10/1975 | Jodoin | 56/235 |
| 4,067,178 | 1/1978 | Miller | 56/235 |
| 4,136,508 | 1/1979 | Coleman et al. | 56/DIG. 15 |
| 4,208,859 | 6/1980 | Brockway | 56/255 |

*Primary Examiner*—Robert A. Hafer
*Attorney, Agent, or Firm*—Jones & Askew

[57] ABSTRACT

Apparatus for trimming Christmas trees or the like to a uniform configuration. The apparatus includes a self-leveling cutter support frame, and a number of knive-like cutting blades mounted on the frame for rotation at high speed. The cutting frame is selectably extendable to accommodate trees having a range of lengths.

12 Claims, 6 Drawing Figures

Fig. 2

Fig_4

Fig_3

Fig. 5

APPARATUS FOR TRIMMING TREES

BACKGROUND OF THE INVENTION

This invention relates in general to apparatus for trimming or pruning living trees, and relates in particular to apparatus for shaping commercially-grown Christmas trees.

Most Christmas trees purchased nowadays by consumers are grown on a commercial Christmas tree farm. These trees are planted, tended, and ultimately harvested as a row crop for the tree farmer, and the trees must be trimmed or pruned from time to time. This tree trimming usually takes place once or twice each year, depending on the size and growth rate of the trees. Periodic trimming shapes the growing tree to the inverted-cone overall shape popularly associated with Christmas trees. Trimming also provides an important horticultural function, namely, setting buds to promote new growth, so as to provide a fuller, more pleasing appearance to the customer.

The conventional manner of trimming or pruning trees is manual labor. The trees are trimming by hand, using conventional hand-held shears to cut off excess growth on each tree. This method produces irregular results determined by variable factors such as the judgment and expertise of each individual doing the trimming, and the amount of time the person spends trimming each tree. Manual tree trimming is also becoming increasingly more costly, due to rising wage rates.

Efforts have been made to provide mechanized tree trimming apparatus, in order to overcome the deficiencies commonly associated with manual trimming. At least one such prior-art machine uses an elongated sickle bar as a cutting element to trim the tree. The sickle bar is supported for movement to generate a conical cutting surface. Such a sickle bar trimming apparatus is shown in U.S. Pat. No. 3,888,071. Sickle bar cutters are normally used for cutting crops such as grains or the like, and tree trimmers using sickle bar cutters have been unsuccessful. The moving elements of the sickle bar soon become gummed by the sap flowing from freshly-growing trees, and the sickle bar tree trimmer must be periodically withdrawn from service to remove the sap or gum from the sickle bar, a time-consuming and wasteful process. Moreover, the sickle bar is awkward and difficult to manipulate while supported in a diagonal upright configuration required for tree trimming. It has also been found that the relatively slow cutting speed of sickle bars tends to pinch the limbs, rather than producing the desired cutting or shearing necessary to promote bud setting and new growth. The sickle bar tree trimmer has the added disadvantage of leaving the trimmings lying on the tree. These trimmings soon turn brown and become unsightly. Moreover, natural decomposition of the trimmings occurs relatively slowly in the air, and without the ecological benefits resulting from decay taking place on the ground.

Other prior art apparatus for tree trimming replaces the sickle bar with a number of rotary power-driven cutting blades. These cutting blades generally resemble circular-saw blades, and are aligned to move along a path to define the desired trimming shape for the tree. It has been found that rotary saw blades tend to bruise or batter the ends of cut limbs, and the cutting efficiency of these blades is reduced as the blades become gummed with tree sap. Moreover, it has been found that rotary saw blades provide a relatively poor cut at the periphery of the blade, which is where most of the cutting effect takes place in a tree trimming apparatus using rotary blades. As an added disadvantage, the relatively large number of rotary saw blades required in prior art apparatus leads to relatively complex mechanical drive problems with the blades.

SUMMARY OF INVENTION

Accordingly, it is an object of the present invention to provide improved apparatus for trimming trees.

It is another object of the present invention to provide tree trimming apparatus which efficiently trims trees in the preferred shape of a Christmas tree.

It is still another object of the present invention to provide tree trimming apparatus easily capable of trimming trees throughout a substantial range of variation in height.

It is yet another object of the present invention to provide tree trimming apparatus having improved cutting means.

It is still another object of the present invention to provide tree trimming apparatus in which the cutting portion is quickly and easily aligned with a particular tree, irrespective of variations in the slope of terrain surrounding the tree.

The foregoing and other objects and avantages are obtained according to the present invention, which in general terms comprises a number of rotary knife-like cutter blades mounted on a cutter support, which in turn is supported in elevated relation to be placed above a tree to be trimmed. The cutter support is supported at a diagonal in relation to the vertical axis, and is rotatable about the tree axis to trim the tree.

Stated somewhat more specifically, the knife-like cutter blades are mounted on a support extending downwardly from a boom carried by a ground-traversing vehicle such as a tractor or the like. The cutter support is suspended above the ground at a location to one side of the tractor, so that the operator can drive the tractor along a row of trees, stopping briefly to position the cutter support over each tree. The operator then manipulates a control to rotate the cutter support substantially one complete revolution, causing the knife-like cutter blades to traverse the tree along a desired trimming line. The cutter support is selectably extendable as needed to trim relatively tall trees so that trees in a substantial range of heights can be trimmer.

The boom elevation is selectably adjustable by the operator to accommodate trees of various heights. The interconnection between the boom and the cutter support can be automatically leveled before trimming each individual tree, so that variations in the terrain supporting the tractor do not affect the trimming.

The present invention along with its other advantages and objects is more clearly understood with reference to the following description of the preferred embodiment.

DESCRIPTION OF PREFERRED EMBODIMENT

Figure 1:
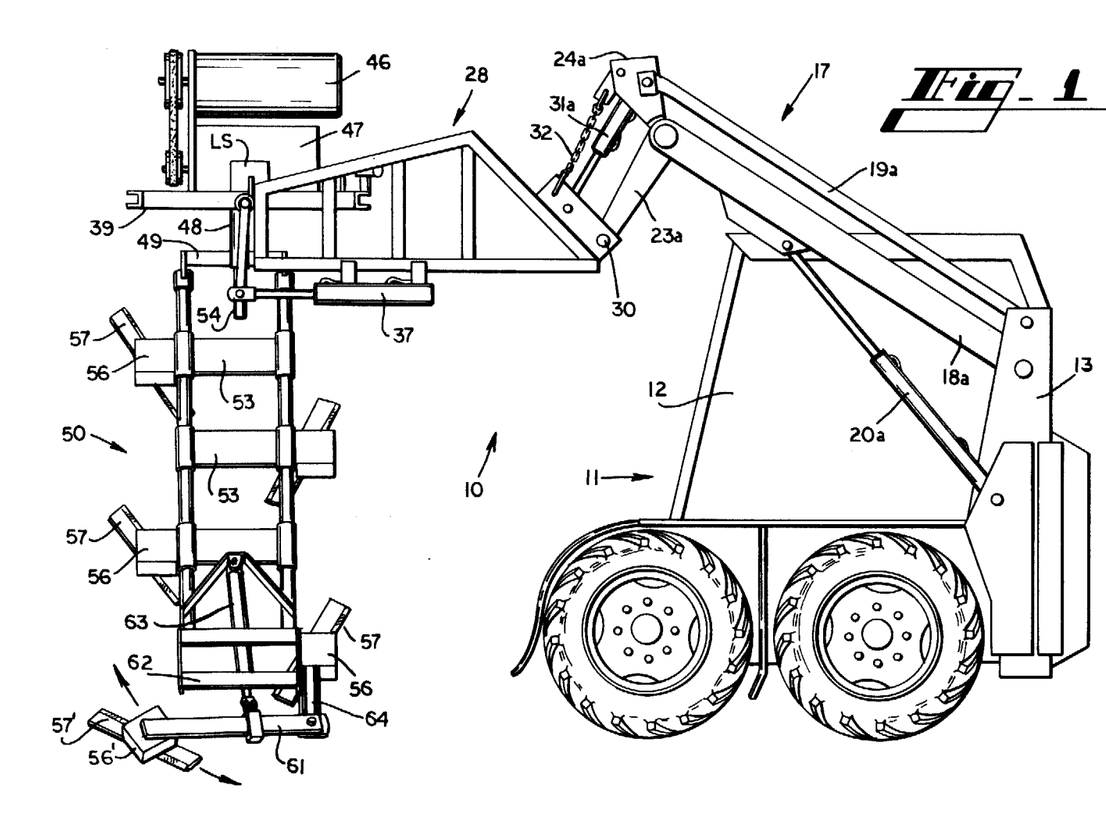
FIG. 1 is an overall elevation view of the disclosed embodiment of the present invention, seen from the left side.
Figure 2:
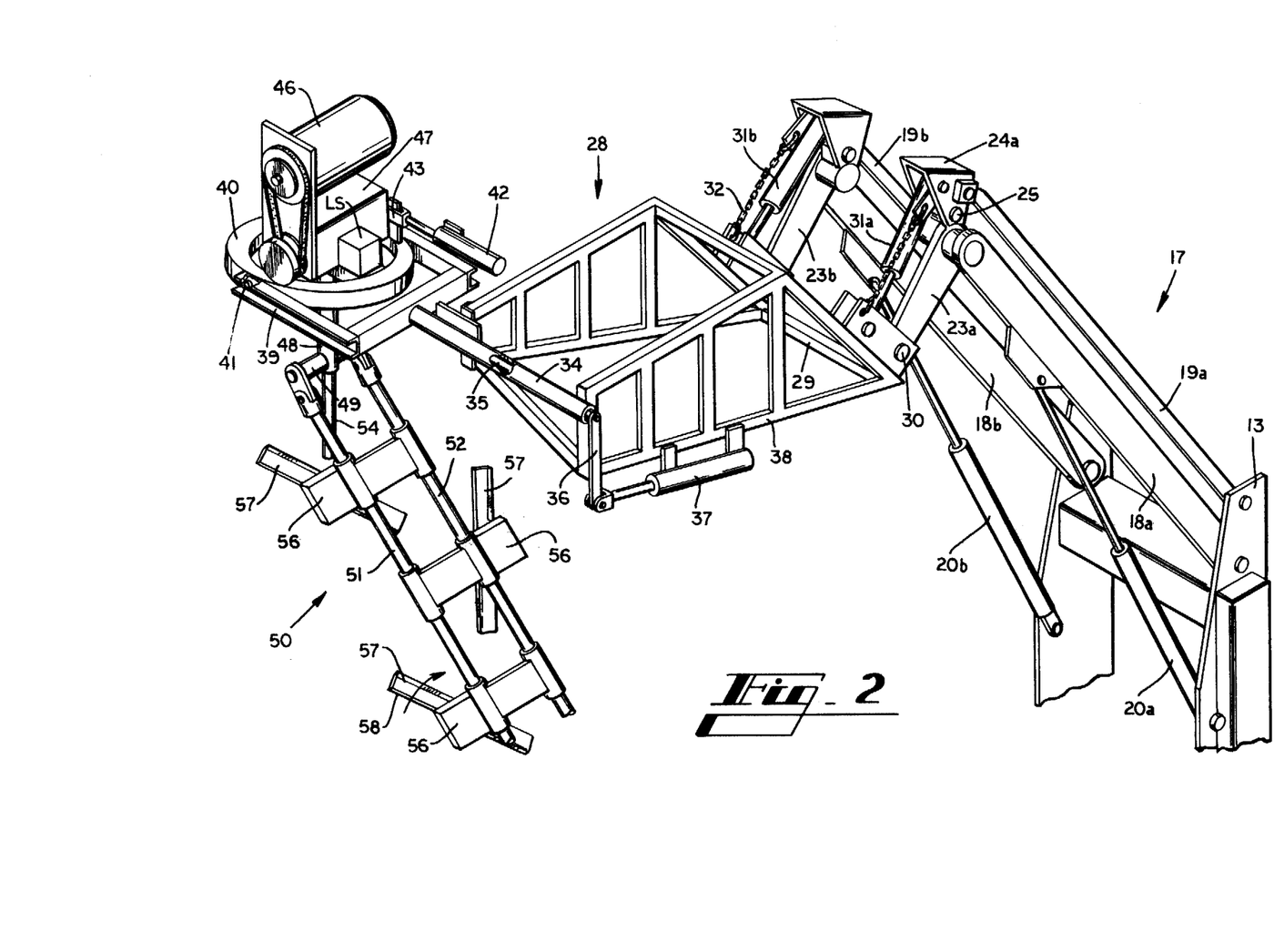
FIG. 2 is an enlarged fragmentary pictorial view of the disclosed embodiment, showing details of the boom and its connection to the cutter support.

Turning first to FIGS. 1 and 2, there is shown generally at 10 a tree trimming apparatus according to a preferred embodiment of the present invention. The apparatus 10 includes a motive device such as the tractor 11, which by itself may be a conventional tractor modified and fitted as described herein to form part of the present apparatus. The tractor 11 includes an operator's cab 12, and vertical frames 13 extending upwardly behind the cab.

Extending forwardly and upwardly from the tractor 11 is the boom assembly 17. The boom assembly 17 includes a pair of main boom members 18a and 18b pivotably secured at their lower ends to opposite sides of the tractor vertical frame 13, and a pair of secondary boom members 19a and 19b also connected to the frame 13 and extending above the main boom members in parallel-linkage arrangement. The elevation of the main boom members 18a and 18b is determined by the hydraulic cylinders 20a and 20b respectively connected between each main boom member and the tractor.

Secured to the outer end of each main boom member 18a and 18b are the boom extension members 23a and 23b. The boom extension members extend forwardly and downwardly from the main boom members at a slightly-obtuse angle as best seen in FIG. 1, and these extension members do not pivot about the main boom members in the disclosed embodiment.

The upper end of each secondary boom member 19a and 19b is pivotably connected to a corresponding linkage 24a and 24b, and these linkages are in turn pivotably attached at pivot points 25 to the upper ends of the main boom members. It is thus understood that the main and secondary boom members, together with the tractor frame 13 and the linkages 24a, 24b, constitute a parallelogram linkage, maintaining the linkages 24a and 24b at a fixed attitude as the main boom members are raised or lowered by the hydraulic members 20a and 20b.

An extension frame 28 is attached to the lower ends of the boom extension members 23a and 23b, in front of the overall boom assembly 17. The rear end 29 of the frame 28 is attached to the free ends of the boom extension members 23a and 23b by pivot connections, one of which is shown at 30 in FIGS. 1 and 2. The attitude of the frame 28 relative to the boom assembly 17 is controlled by a pair of hydraulic cylinders 31a and 31b, extending between the frame and the respective linkages 24a, 24b of the main boom assembly and constituting part of a second parallelogram linkage which positions the frame 28 relative to the main boom assembly. A pair of safety chains 32 extends between the frame 28 and the linkages 24a, 24b to protect the frame and other parts from excessive downward movement, in the event of mechanical or hydraulic failure.

A hollow horizontal bearing tube 34 extending transversely across the frame 28 is attached to the front end of the frame. A support shaft 35 extends through the hollow bearing tube 34, and one end of the support shaft is attached to the crank arm 36. The free end of the crank arm 36 is attached to the piston rod of a hydraulic cylinder 37, which is secured to the side member 38 of the frame 28. The other end of the support shaft 35 extends beyond the right end (as seen by the tractor operator) of the bearing tube 34, and is secured to the U-shaped gimbal outer frame 39. It can be seen that extension or retraction of the hydraulic cylinder 37 adjusts the position of the outer frame 39 about a horizontal axis transverse to the direction of tractor travel.

Carried by the gimbal outer frame 39 is the gimbal inner frame 40, which is mounted for pivotable movement about an axis 41 perpendicular to the axis of the support shat 35 which carries and positions the outer frame. The piston of a hydraulic cylinder 42, mounted on the outer frame 39, is connected to the crank arm 43 affixed to the inner frame 40. It will be understood that the position of the inner frame 40 about the axis 41, which is parallel to the direction of tractor travel, is adjusted by operation of the hydraulic cylinder 42.

Carried by the inner frame 40 is a rotary drive mechanism including a hydraulically-powered motor 46 connected to drive the right-angle drive 47. The output drive shaft 48 of the right-angle drive 47 extends downwardly from the gimbal inner frame 40. A center line-up pin 54 extends downwardly from the lower end of drive shaft 48. The pin 54 may be approximately twelve inches long and approximately ¼" to ⅜" in diameter, and is for a purpose described below.

The drive shaft 48 is connected to the upper end 49 of the cutter support frame 50. The cutter support frame includes a pair of structural frame members 51 and 52 which are secured to the upper end member 49, and it should be understood that the individual frame members may actually be built from several separate elements secured together by welding or the like.

The frame members 51 and 52 are mounted in parallel spaced-apart relation, and are interconnected by several spacers 53 which bridge between the two frame members at several selected locations along the length of the cutter support frame 50. As best seen in FIG. 2, the entire cutter support frame 50 extends downwardly on a diagonal plane relative to the vertical axis of the drive shaft 48. The diagonal angle of the cutter support frame 50 is selected to define the desired inverted-cone shape of trees to be trimmed by the present apparatus, as will become more apparent.

Attached to the cutter support frame 50 at spaced-apart locations along its length are a number of hydraulically-powered rotary motors 56. Each motor 56 carries on its output shaft a separate knife-like cutting blade 57, and each cutting blade has sharpened leading edges 58 facing the direction of blade rotation. Each cutting blade 57 is preferably slightly pitched relative to a nominal flat plane, in a direction tending to blow away from a tree being trimmed, so that clippings from the trimmed tree tend to be blown or otherwise displaced outwardly and away from the tree. A blade pitch of approximately two degrees is satisfactory.

As best seen in FIG. 1, the cutter support frame 50 of the disclosed embodiment has four separate powered cutting blades 57, and each blade with its corresponding motor 56 is mounted on alternate frame members 51 and 52 to provide a staggered array of cutting blades. Adjacent cutting blades are longitudinally spaced along the support frame 50 to provide some overlap between the cutting area swept by each blade, as the cutting frame rotates around the axis of shaft 48, and this cutting overlap insures that no portion of the tree remains untrimmed. It should be understood that the choice of four cutting blades 57 on the frame 50 is a matter of choice, and that more or fewer blades can be substituted to meet particular trimming requirements.

Although the length of the support frame 50 and the number of separate cutting blades 57 carried thereon will be selected to trim the greatest number of trees, it is difficult to provide a cutter support frame of optimum length for cutting a wide range of tree heights. Shorter trees cannot be effectively trimmed by a cutter frame substantially greater than the overall diagonal dimension of the tree, and a support frame designed for trimming shorter trees may leave untrimmed portions at the bottom of taller, more mature trees.

Figure 3:
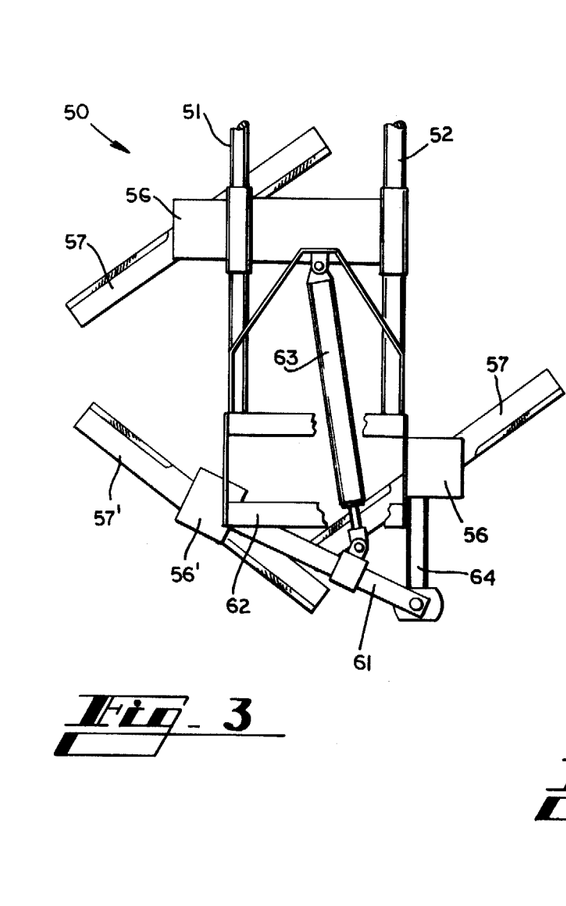
FIGS. 3 and 4 are elevation views showing the lower end of the cutter support, with the extension member depicted in retracted and extended positions, respectively.

In order to overcome this problem, the support frame 50 is equipped with an extension member 61 pivotably supported on a fixed arm 64 extending outwardly from the lower end 62 of the cutter support frame 50. A hydraulic cylinder 63 is connected between the extension member 61 and the support frame 50, so as to move the extension member either to a retracted position shown in FIG. 3, or to a fully-extended position shown in FIG. 4. Mounted adjacent the outer end of the extension member 61 is an additional hydraulically-powered motor 56', driving a knife-like cutting blade 57' substantially like the other cutting blade 57. The motor 56' may be connected in common hydraulic circuit with the other motors 56, so that all motors 56 and 56' rotate constantly while the apparatus is operating.

Figure 4:
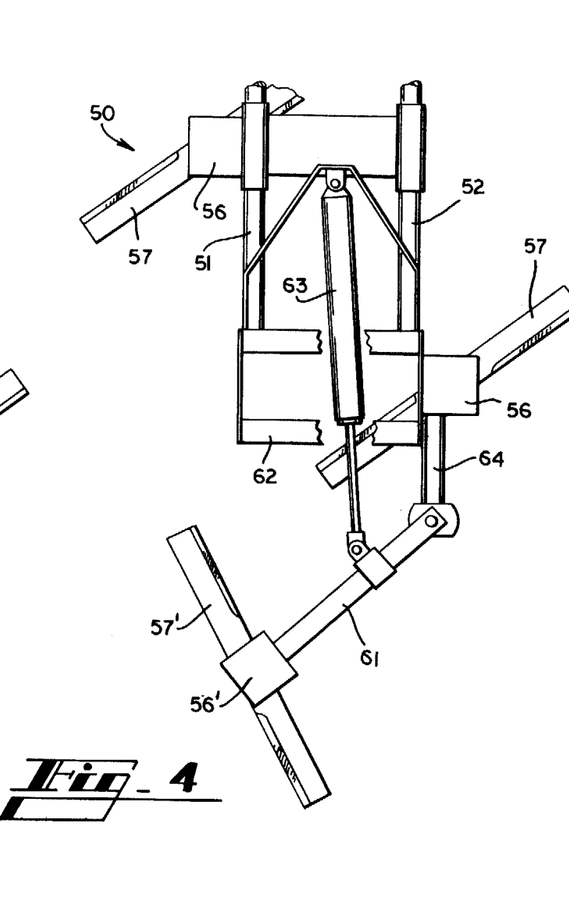

When the extension member 61 is fully extended as shown in FIG. 4, the cutting blade 57' is extended to provide one additional cutting blade, cutting a swath slightly overlapping the cutting swath of the blade 57 mounted lowermost on the support frame 50. This extended position is used whenever trees of relatively greater height are being cut. When cutting smaller trees, the hydraulic cylinder 63 is actuated to withdraw the extension member 61 to the position shown in FIG. 3. Although the blade 57' continues to rotate in this withdrawn position, the blade is positioned to one side of the support frame 50 and performs no cutting function. The overall cutting length of the support frame 50 thus is effectively shortened to accommodate trimming shorter trees.

Figure 5:
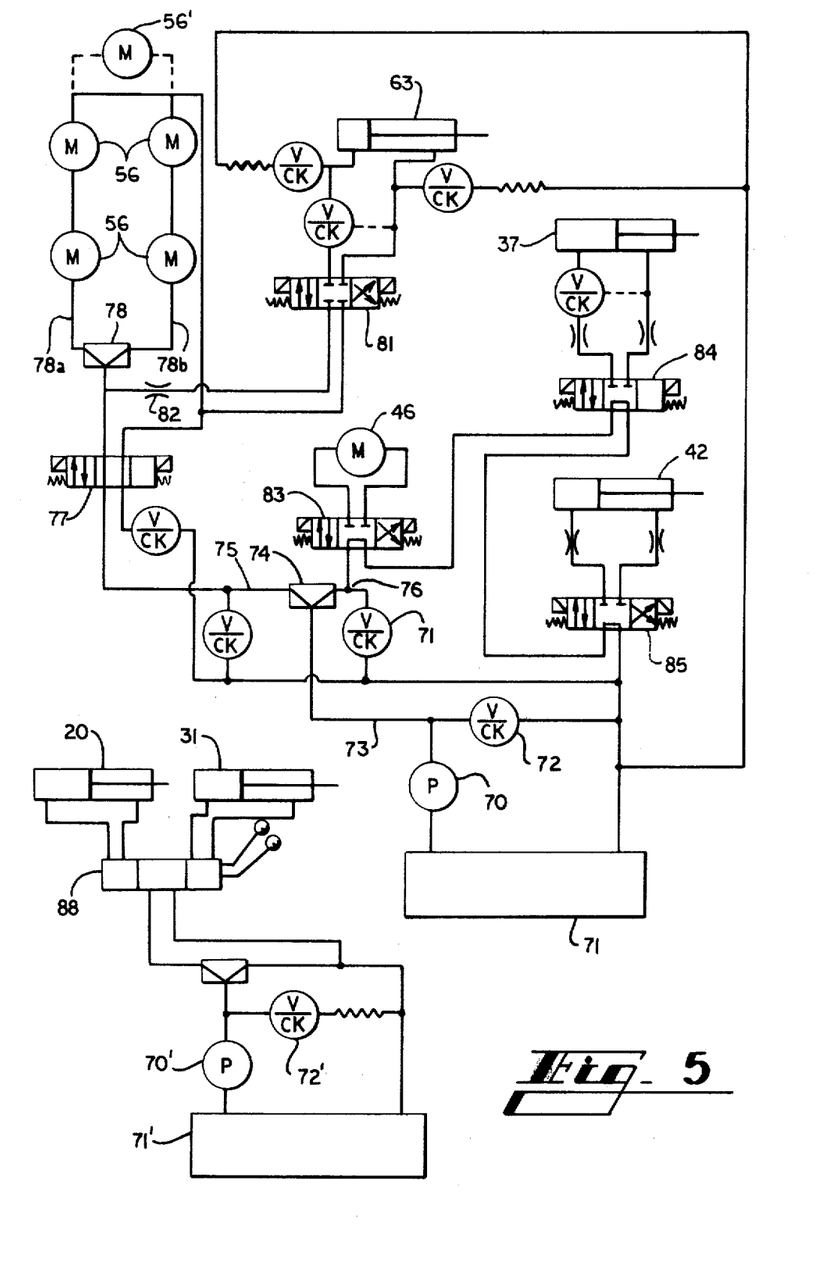
FIG. 5 is a schematic view of the hydraulic operating system for the disclosed embodiment.

The hydraulic operating system for the disclosed embodiment is schematically shown in FIG. 5. This hydraulic system includes two separate systems including pumps 70 and 70', fluid reservoirs 71 and 71', and pressure relief valves 72 and 72'. The use of two separate hydraulic pumps to power the present apparatus is determined by the horsepower of the tractor 11 available for operating the hydraulic system, as well as power requirements of tractor cab air conditioning or other accessories forming no part of the present invention. With one specific embodiment of the present invention using a tractor including cab air conditioning, the available horsepower of the tractor engine was inadequate to meet the hydraulic power requirements of the present tree trimming apparatus, and so it was necessary to provide the second pump 70'. An auxiliary internal combustion engine (not shown), carried by a trailer coupled to the tractor, was provided to drive the pump 70'. In applications using a tractor not equipped with cab air conditioning, however, it may be possible to provide all hydraulic requirements with only a single pump 70.

The output line 73 of the pump 70 supplies hydraulic pressure to the flow divider 74, which functions in a conventional manner to provide a constant-flow output 75 and a variable-flow output from the exhaust port 76. The constant-flow line 75 is connected to the solenoid valve 77, which is controlled in a manner described below to supply oil to the motors 56 and 56' which rotate the cutting blades.

Oil flow through the solenoid valve 77 passes to the flow divider 78, and there branches into two flow paths 78a, 78b of substantially equal volume. Each of the flow paths 78a and 78b is connected in series with a pair of the hydraulic motors 56, and the hydraulic motor 56' mounted on the extension member 61 is also connected in series with one of the flow paths 78a or 78b. It will thus be seen that all cutter blades are simultaneously rotated whenever the hydraulic system is operating and the solenoid valve 77 is actuated.

The hydraulic output from solenoid valve 77 also goes to solenoid valve 81, after passing through the flow restrictor 82. The solenoid valve 81 is connected to the double-action hydraulic cylinder 63, which extends or retracts the extension member 61 carrying the lowermost cutting blade 57'. Although the cylinder 63 shares the output of the constant-flow line 75 which drives the cutter motors 56 and 56', the cylinder 56 is normally actuated only before or after an actual trimming operation, and its operation does not adversely affect the operating speed of the cutter motors during cutting. It is thus seen that the cutter motors receive a constant flow of oil through the flow divider 74, allowing these motors and the attached cutting blades to operate at a substantially constant speed irrespective of other demands on the hydraulic system.

Hydraulic flow from the variable-flow output 76 of the flow divider 74 provides power to rotate the cutter support frame 50, and to level the cutter support frame in two axes. The varible-flow output 76 is supplied in series to the three solenoid valves 83, 84, and 85. The solenoid valve 83 selectably supplies bi-directional hydraulic power to the rotary motor 46 which rotates the cutter support frame 50. The series-connected solenoid valves 84 and 85 selectably supply hydraulic power to the cylinders 37 and 42, respectively, which control the position of the gimbal outer frame 39 and inner frame 40. The leveling cylinders 37 and 42 will not be operated while the cutter support frame is rotating, as is pointed out below, and so hydraulic power for the two leveling cylinders can be supplied in series with the operating power for the rotation motor 46.

The main boom cylinders 20a and 20b are driven by the auxiliary hydraulic supply 70' through the manual control valve 88; these two cylinders are collectively designated at 20 in FIG. 5, and it will be understood that the separate cylinders for the main boom are connected in series. The two cylinders 31a and 31b connected to pivot the extension frame 28 relative to the main boom are collectively shown at 31 in FIG. 5, and are also operated through the manual control valve 88. The control valve 88 may be positioned to be foot-operated by the operator of the tractor 11, so that the elevation and attitude of the boom can be adjusted as desired while the tractor is moving toward a tree to be trimmed.

Figure 6:
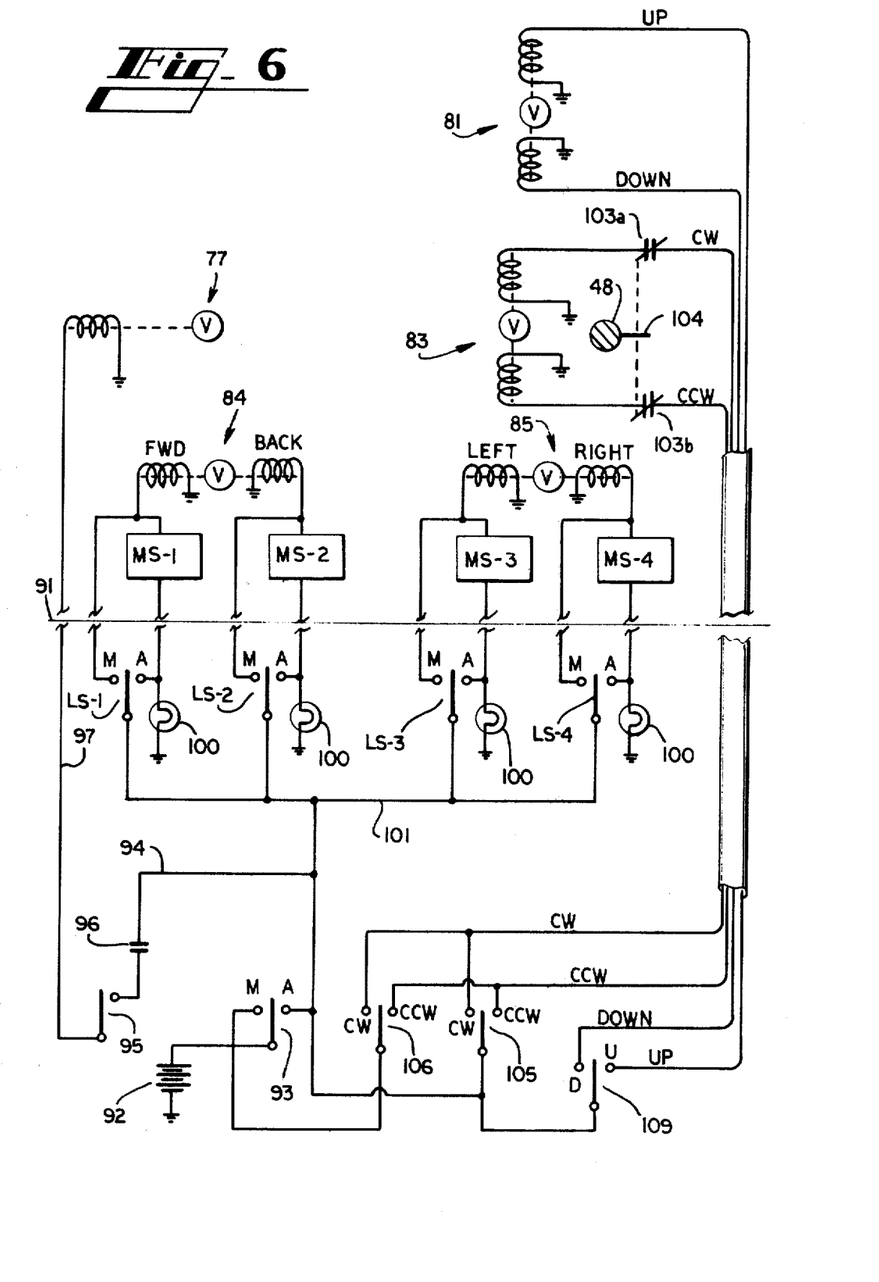
FIG. 6 is a schematic view of the electrical control system for the disclosed embodiment.

The electrical system of the disclosed embodiment is shown in FIG. 6. The parting line 91 shown in that figure symbolically separates the electrical control elements shown above the line and located on the boom from those elements shown below the line and located on the tractor.

Power from the battery 92 is supplied to the master switch 93, which can be actuated either to the automatic position "A" or the manual position "M". When in automatic position, the master switch 93 supplies power along line 94 to the cutter motor control switch 95 by way of the normally-open seat switch 96. Power from the cutter control switch 95 is supplied along line 97 to operate the solenoid valve 77, which supplies oil to rotate the cutter motors as described above.

The seat switch 96 is mechanically interconnected with the operator's seat (not shown) in the tractor 11, and is closed only while the seat is occupied. Thus, the solenoid valve 77 can be operated to drive the cutter motors only when the master switch 93 is in automatic position, the cutter control switch 95 is closed, and the tractor operator is seated. If the operator leaves the tractor seat for any purpose, the seat switch 96 opens and the cutter motors immediately stop rotating, so that the operator cannot be accidentally injured by the rapidly-spinning cutting blades 57.

Electrical power from the master switch 93, in automatic position, is also supplied along line 101 to the armatures of level control switches LS-1 through LS-4, each of which is separately switchable either to a manual mode "M" or an automatic mode "A". Each level control switch separately selects either manual or automatic leveling control of the gimbal arrangement which supports the shaft 48, to which the cutter support frame 50 is attached. Thus, the hydraulic cylinder 37 connected to the gimbal outer frame 39 is selectively moved forwardly or backwardly depending on actuation of the solenoid valve 84, and left-right movement of the gimbal inner frame 40 is likewise accomplished by the hydraulic cylinder 42 controlled by the solenoid valve 85.

The attitude of the cutter support frame is sensed by four mercury switches MS-1 through MS-4, supported in the housing LS on the inner frame 40. These mercury switches are positioned 90° apart along the longitudinal or front-back axis and along the transverse or left-right axis, respectively, and those skilled in the art will understand that the electrical contacts of each mercury switch become closed whenever the switch attitude deviates from a level attitude in the selected path. Thus, forward-responsive mercury switch MS-1 closes whenever the inner frame 40 tips forwardly from level, and the back-responsive mercury switch MS-2 closes whenever the inner frame tips backwardly from level. Similarly, mercury switches MS-3 and MS-4 separately close whenever the inner frame 40 tips either to the left or to the right, respectively.

Accordingly, the cutter support frame 50 is self-leveling along any selected combination of the foregoing four axes, by switching the corresponding level control switches LS to the automatic mode. If level control switches LS-1 and LS-2 are switched to automatic, for example, the mercury switches MS-1 and MS-2 sense departures from level in either the forward or backward direction, respectively, and these mercury switches actuate the appropriate coil of the solenoid valve 84 to move the gimbal inner frame 40 back to level position. Automatic leveling along the left-right axis is similarly enabled by moving the switches LS-3 and LS-4 to the automatic mode. The gimbal inner frame and the shaft 48 thus can be automatically leveled despite variations in terrain traveled by the tractor, so that the cutter support frame is diagonal with respect to vertical.

The cutter support frame 50 can also be manipulated manually in any of the four directions, by moving the appropriate level control switch to the manual position.

Separate indicator lamps 100 are connected with each of the level control switches LS to be illuminated whenever the respective switch is in the automatic mode. These indicator lamps let the tractor operator know which of the four axes are presently set for automatic leveling.

The shaft 48 (fragmentarily shown in FIG. 6) and attached cutter support frame 50 are rotated by the hydraulic motor 46, in either the clockwise or counterclockwise direction as determined by actuation of the solenoid valve 83. A pair of normally-closed limit switches 103a and 103b are positioned to be actuated by the arm 104 attached to the shaft 48 whenever the shaft substantially completes a revolution in either direction, and it will be understood that the limit switches provide end-of-rotation control to prevent the shaft from rotating more than substantially one complete revolution in either direction. Each of the limit switches 103a and 103b are connected in series to a respective coil of the solenoid valve 83.

The shaft 48 may be rotated either manually under operator control, or automatically to undergo a complete revolution in response to operator iniatiation. The automatic mode is selected by the switch 105, which is connected to receive power through the master switch 93 only in automatic mode. When the switch 105 is moved either to the clockwise (CW) or counterclockwise (CCW) positions, power is supplied on the respective line to the solenoid valve through the normally-closed limit switch 103a or 103b. Solenoid valve 83 opens in the selected direction to supply oil to the motor 46, causing the shaft 48 to rotate in the selected direction. When the shaft 48 completes one revolution, the arm 104 engages and opens the appropriate limit switch 103a or 103b, breaking the circuit to the solenoid valve 83 and stopping rotation. The next rotation of the shaft 48 will be in the opposite direction, and is initiated when the operator moves the rotation control switch 105 to its other position to initiate another complete revolution in the opposite direction. The switch 105 may be a pushbutton which stays in the CW or CCW position manually selected.

Manual rotation of the shaft 48 and cutter support frame 50 is accomplished by the manual rotation switch 106, whenever the master switch 93 is in the manual mode. The limit switches 103A and 103B remain in the control circuit to prevent over-rotation under manual control. It should be understood that the automatic rotation control switch 105 may be mounted on the tractor steering controls for convenient operation when the tractor is appropriately positioned over a tree, and the manual rotation switch 106 may be positioned elsewhere in the tractor cab. Rotation of the cutter support frame under manual control is useful in order to position the cutter support frame to a particular angular position for maintenance or repair.

Raising and lowering the extension cutting blade 57' by the hydraulic cylinder 63, under control of the solenoid valve 81, is accomplished by the extension switch 109, which may be a spring-loaded switch which returns automatically to neutral. This switch simply selects either the "up" coil or the "down" coil of the solenoid valve 81, to actuate the hydraulic cylinder 63 in the selected direction.

The operation of the overall tree trimming apparatus can should now be apparent. The cutter support frame 50 is laterally offset from the tractor, as best seen in FIG. 2, allowing the tractor operator to drive alongside a row of trees to be trimmed. The overall elevation of the trimming apparatus is controlled by the main boom assembly 17, and relatively minor height adjustments may also be made by operating the hydraulic cylinders 31a, 31b to position the extension frame 28.

The operator approaches a particular tree and positions the tractor so that the rotary shaft 48 is positioned directly above the tree, as indicated by the line-up pin 48 which may extend downwardly to touch the tree top. The level control switches LS are placed in the automatic mode as the tractor approaches the tree, so that the inner gimbal frame has been maintained level irrespectively of irregularities in the terrain traveled by the tractor. Depending on the height of the particular tree, the operator may extend or retract the extension cutting blade 57'.

It is assumed the cutting blades have already been actuated by the control switch 95. Rotation of the blades about the tree is now selected simply by flipping the switch 105, allowing the cutter support frame to automatically undergo one complete revolution about the tree. When the frame revolution automatically stops, the operator simply drives the tractor on to the next tree in the row, and repeats the cutting operation.

The cutting blades in the disclosed embodiment are approximately 24 inches long, and are rotated at approximated 2000 RPM to provide a tip speed of approximately 2,500 inches per second. This combination of knife-like cutting blades operating at a relatively high speed gives the tree limbs a smooth cut, with no pinching and little or no bruising or battering of the limb ends. This smooth cut enables the limbs to set more buds, for thicker and more desirable trees. The relatively high speed of the blades cuts the cuttings into small particles, and the slight outward pitch of the blades tends to blow these particles outwardly from the tree. The cut particles thus fall onto the ground, rather than remaining hanging on the tree.

Accumulations of tree sap or gum are quickly and easily removed from the blades by scraping. This is usually required twice daily during heavy use, and takes approximately five minutes each time due to the simple configuration of the knife-like blades, which lack the multiple small teeth of the circular-saw blade.

It should also be understood that the foregoing is but a disclosed embodiment of the present invention, and that numerous changes and modifications may be made therein without departing from the spirit and scope of the invention as defined in the following claims.

I claim:

1. Apparatus for trimming living trees or the like, comprising:
   motive means operative to traverse the ground adjacent a row of trees to be trimmed;
   boom means mounted on said motive means and having a free end selectably operative to be adjustably positioned in predetermined relation to a tree to be trimmed;
   cutter support means depending from said outer end of said boom means;
   interconnection means interposed between said cutter support means and said outer end, and selectably operative to position said cutter support means relative to said boom means;
   tilt responsive means responsive to the angular position of said cutter support means and operative to provide signals responsive to the angular position of said cutter support means with respect to a predetermined reference attitude; and
   said interconnecting means being operative in response to said signals from said tilt responsive means to maintain said cutter support means in a certain angular position relative to said reference attitude, irrespective of the angular position assumed by said motive means or said boom means.

2. Apparatus as in claim 1, wherein
   said interconnection means is operative to position said cutter support means in at least two degrees of freedom; and
   said tilt responsive means is selectably operative to provide signals responsive to the angular position of said cutter support means in one of said two degrees of freedom, so that said cutter support means is automatically leveling with respect to said reference attitude.

3. Apparatus as in claim 1, further comprising:
   manually operative means connected to said interconnection means to selectably control the angular position of said cutter support means; and
   mode selector means associated with said manually operative means and said level responsive means to select either said manually operative means or said tilt responsive means to control operation of said interconnecting means.

4. Apparatus as in claim 1, further comprising:
   means disposed at said outer end of said boom means to rotate said cutter support means about an axis of rotation;
   said cutter support means being supported at an acute angle to said axis of rotation; and
   cutting means mounted on said cutter support means to trim along a trim line at an acute angle to said axis of rotation, so that a tree beneath said cutter support means is trimmed to a shape defined by rotation of said trim line.

5. Apparatus as in claim 1, wherein:
   said boom means comprises a boom assembly having a lower end mounted on said motive means and an upper end disposed in adjustably spaced relation to the motive means;
   an extension assembly having a back end supported by said upper end of the boom assembly and having a front end selectably positionable relative to said boom assembly; and
   said interconnection means being supported at said front end of said extension assembly;
   so that said cutter support means depends from the front end of said extension assembly, and said interconnection means maintains the angular position of the cutter support means independent of the position of said boom assembly and extension assembly.

6. Apparatus as in claim 5, wherein:
   said interconnection means comprises a first movable support member supported at the front end of said extension assembly and selectably movable in response to signals from said tilt responsive means to maintain a certain angular position in a first plane;
   a support frame mounted on said movable first support member;
   a second movable support member mounted on said support frame and selectably movable in response to signals from said tilt responsive means to maintain a certain angular position in a second plane; and said cutter support means supported by said second movable support means so as to be positioned in said first and second planes by respective movement of said first and second movable support members.

7. Apparatus for trimming living trees or the like to a symmetrical shape about a vertical axis, comprising:

motive means operative to traverse the ground along a row of trees which may vary substantially in height;

means carried by said motive means in elevated relation above a tree to be trimmed;

cutter support means extending diagonally downwardly from said elevated means, and terminating at a distal end;

a plurality of separate powered rotary cutting members carried by said cutter support means in mutually spaced apart relation to define a tree trimming line in fixed relation to said cutter support means; and extension means movably joined to said cutter support means adjacent said distal end and selectably movable to extend a distance beyond the distal end of the cutter support means, so as to extend the overall length of the cutter support means when extended; and at least one other powered rotary cutting member carried by said extension means to be disposed in alignment with said tree trimming line when said extension means is extended, thereby selectably operative to extend the effective length of the trimming line to permit trimming taller trees than can be trimmed when unextended.

8. Apparatus as in claim 7, further comprising:

motive means operatively associated with said extension to place the extension means either in said extended position, or in a withdrawn position wherein said other cutting member is displaced so as not to extend said trimming line.

9. Apparatus as in claim 7, further comprising:

rotation means operative to rotate said cutter support means relative to said elevated means, about said vertical axis, so that said cutting members are traversed around a tree to trim the tree to a symmetrical shape defined by said tree trimming line.

10. Apparatus as in claim 9, wherein said rotation means comprises:

rotation control means selectably operable to initiate rotation of said cutter support means;

motive means operative in response to said rotation control means to rotate said cutter support means substantially one revolution about said vertical axis and then stop; and direction control means associated with said motive means to reverse the direction of rotation in response to each successive revolution initiated by said rotation control means, so that each successive revolution of the cutter support means is in the opposite direction from the preceding revolution.

11. Apparatus as in claim 7, wherein:

said extension means comprises an extension member pivotably connected to said cutter support means and selectably pivotable either to the extended position whereat said other rotary cutting member carried by the extension member is aligned with said tree trimming line, or to the unextended position whereat said other cutting member is withdrawn from the trimming line.

12. Apparatus for trimming living trees or the like to a symmetrical shape about a vertical axis, comprising:

motive means operative to traverse a path along a row of trees to be trimmed;

cutter support means carried by said motive means in elevated relation above a tree to be trimmed;

a plurality of separate powered cutting members carried by said cutter support means in mutually spaced apart relation to define a tree trimming line; and each cutting member comprising an elongated knife-like rotating cutting blade having at least one leading edge to contact and cut limbs of the tree extending in said tree trimming line, each cutting blade being pitched to blow away from the tree being trimmed, so that rotation of the cutting blades tends to move tree clippings outwardly and away from the tree to fall to the ground instead of remaining on the trimmed trees.

* * * * *